(12) United States Patent
Vandewater

(10) Patent No.: US 8,832,961 B1
(45) Date of Patent: Sep. 16, 2014

(54) VEHICLE-DRYING AIR BLOWER

(76) Inventor: Todd E. Vandewater, Brookline, NH (US)

(*) Notice: Subject to any disclaimer, the term of this patent is extended or adjusted under 35 U.S.C. 154(b) by 778 days.

(21) Appl. No.: 13/087,173

(22) Filed: Apr. 14, 2011

(51) Int. Cl.
*F26B 19/00* (2006.01)

(52) U.S. Cl.
USPC .................................. 34/270; 34/97

(58) Field of Classification Search
CPC .... F26B 2210/12; A45D 20/00; A45D 20/06; A45D 20/10; A45D 20/12; A45D 20/36; A45D 20/122; F24H 3/0423
USPC .......... 34/90, 666, 96, 97, 283, 270; 392/379, 392/380, 383, 384, 385; 132/212
See application file for complete search history.

(56) References Cited

U.S. PATENT DOCUMENTS

| | | | |
|---|---|---|---|
| 4,209,875 A * | 7/1980 | Pugh et al. | 15/344 |
| 4,366,368 A | 12/1982 | Stephens, III | |
| 4,827,105 A * | 5/1989 | Brown, Jr. | 34/97 |
| 5,216,822 A * | 6/1993 | Madiedo | 34/97 |
| 5,251,281 A * | 10/1993 | Fravel, Jr. | 34/666 |
| 5,584,436 A | 12/1996 | Sepke | |
| 6,148,537 A * | 11/2000 | Altamore | 34/97 |
| 6,195,907 B1 | 3/2001 | Bodnar et al. | |
| 6,286,228 B1 | 9/2001 | Bodnar et al. | |
| 2008/0152487 A1* | 6/2008 | Shaffer et al. | 415/208.1 |

OTHER PUBLICATIONS

Black and Decker 12 Amp 200 MPH Yard Blower / Vacuum: Model #BV2500. <http://web.archive.org/web/2011026132924/http://www.blackanddecker.com/outdoor/BV2500.aspx>. Accessed Feb. 20, 2014.*

* cited by examiner

*Primary Examiner* — Kenneth Rinehart
*Assistant Examiner* — Tavia Sullens
(74) *Attorney, Agent, or Firm* — Crossley Patent Law; Micah C. Gunn

(57) ABSTRACT

A vehicle-drying air blower for drying a vehicle exterior, the air blower including a base housing having a fan disposed in a fan compartment thereof and a motor, which is operational communication with the fan, disposed in a motor compartment thereof. An air intake housing having an intake duct attached thereto receives an incoming air stream upon the activation of a trigger switch disposed on a handle on the base housing bottom side. A soft rubberized ergonomic grip area is disposed on a handle forward end proximal to a lower end thereof allowing a user to hold the air blower comfortably for an extended period of time during operation. A nozzle extending from a base housing collar is soft and rubberized to prevent denting and scratching a vehicle exterior during operation.

6 Claims, 3 Drawing Sheets

VEHICLE-DRYING AIR BLOWER

BACKGROUND OF THE INVENTION

Figure 1:
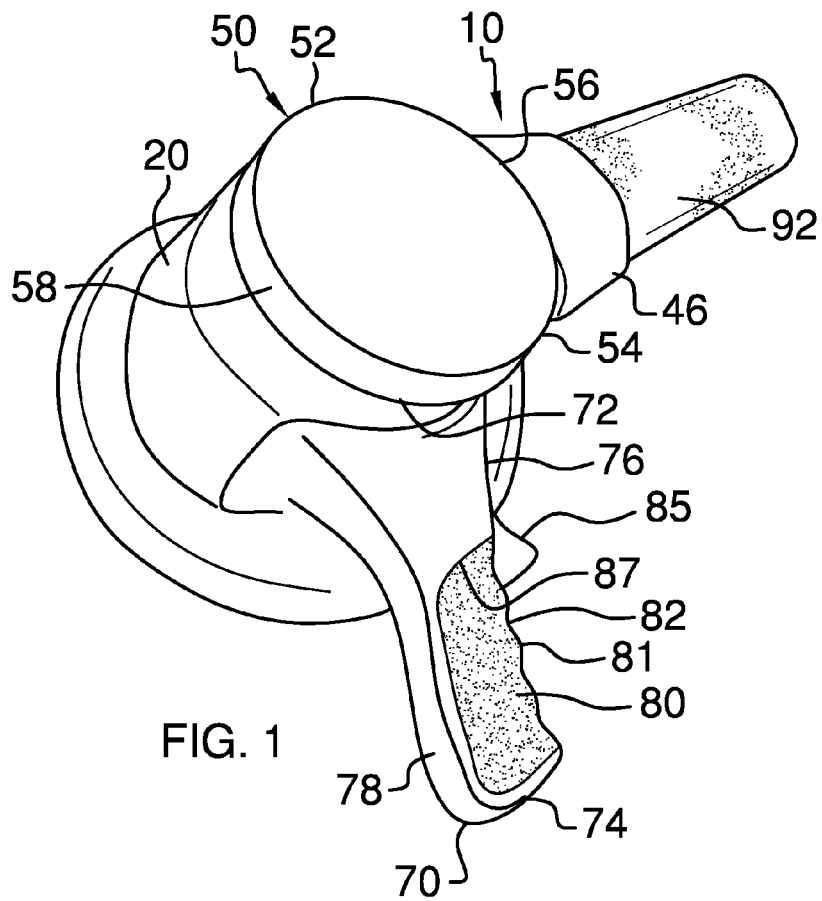

Various types of vehicle drying systems and devices are known in the prior art. However, what is needed is a vehicle-drying air blower having an ergonomic grip area and trigger and a soft tip to prevent scratches and dents to a vehicle's body.

FIELD OF THE INVENTION

The present invention relates to portable vehicle drying devices, and more particularly, to a vehicle-drying air blower which has an ergonomic grip and a trigger as well as a soft tip for passage of air therefrom.

SUMMARY OF THE INVENTION

The general purpose of the present vehicle-drying air blower, described subsequently in greater detail, is to provide a vehicle-drying air blower which has many novel features that result in a vehicle-drying air blower which is not anticipated, rendered obvious, suggested, or even implied by prior art, either alone or in combination thereof.

The present vehicle-drying air blower is designed to dry a wet vehicle exterior, such as the exterior of an automobile, a boat, a motorcycle, a recreational vehicle, or a semi-trailer truck. The vehicle-drying air blower includes a base housing. The base housing has a fan disposed in fan compartment thereof and a driver, which is operational communication with the fan, disposed in a driver compartment thereof. An air intake housing, having an intake duct disposed thereon, is fixedly attached to the base housing. A handle is disposed on a base housing bottom side of the base housing. A soft rubberized ergonomic grip area is disposed on a forward end of the handle proximal to the lower end. The soft rubberized properties of the grip area allow the user to more securely and comfortably hold onto the handle for a longer period of time than would be the case if the grip area was formed of hard material, particularly when the present air blower is being used to produce air speeds of approximately 200 miles per hour. A plurality of ridges and a plurality of depressions therebetween are disposed within the grip area on the handle forward end. Each depression is sized to accommodate a user's finger therein. The ridges and the depressions allow a user to more firm grip the handle than if the handle forward end were flat.

A trigger switch, which is disposed on the handle forward end proximal to a top end of the grip area, allows a user to hold onto the grip area while operating the trigger switch. The trigger switch is in operational communication with the driver. Activation of the trigger switch activates the driver. Activation of the driver, in turn, activates the fan.

A substantially cylindrical soft rubberized nozzle is attached to a collar on the front end of the base housing. The soft rubberized property of the nozzle allows a user to blow dry a wet vehicle exterior without denting or scratching the vehicle exterior. Activation of a release button disposed on the collar releases the nozzle from the collar. Upon activation of the fan, the fan directs an incoming air stream through the air intake housing into the base housing, and an outgoing air stream through the base housing outwardly therefrom through the outer end of the nozzle. As the outgoing air stream exits the nozzle outer end, the outgoing air stream passes over a wet surface, which includes a wet vehicle exterior.

To use the present vehicle-drying air blower, a user attaches the nozzle to the collar and places his fingers into the grip area depressions to hold the handle firmly. The user pulls the trigger switch toward the handle to activate the driver, which in turn, activates the fan to direct an incoming air stream through the base housing and an outgoing air stream through the nozzle outer end. The user directs the outgoing air stream toward a wet surface, including a wet vehicle exterior, to dry the wet surface.

The present vehicle-drying air blower reduces the energy and time required to complete dry a vehicle after washing and eliminates the need to locate and use a chamois which does not completely dry the vehicle and, further, scratches the vehicle paint finish over time. The present air blower uses a 10 to 12 amp electric motor or gas engine to produce an outgoing air stream of approximately 200 miles per hour. With the large capacity motor, the air blower efficiently removes water from a vehicle in areas impossible to dry with a chamois, such as door seams, behind chrome strips, wire wheels, window channels, door handles, mirrors, tires, behind gas filler doors, roof racks, grills, bumpers, and other nooks and crannies in a vehicle exterior. The present air blower reduces rust problems by completely drying a vehicle exterior.

The present air blower has a total length of approximately 28 inches making the air blower lightweight and easy to handle.

Thus has been broadly outlined the more important features of the present vehicle-drying air blower so that the detailed description thereof that follows may be better understood and in order that the present contribution to the art may be better appreciated.

BRIEF DESCRIPTION OF THE DRAWINGS FIGURES

Figure 2:
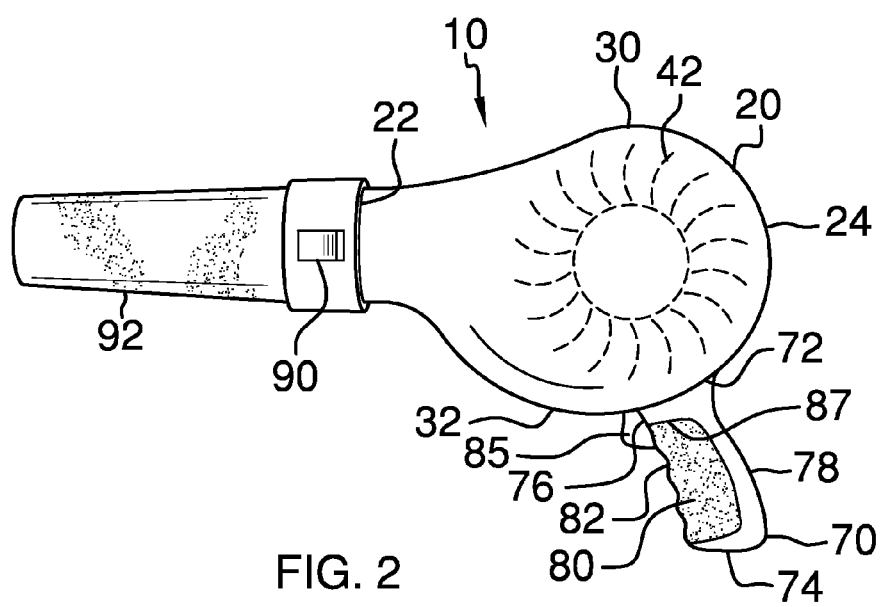
Figure 3:
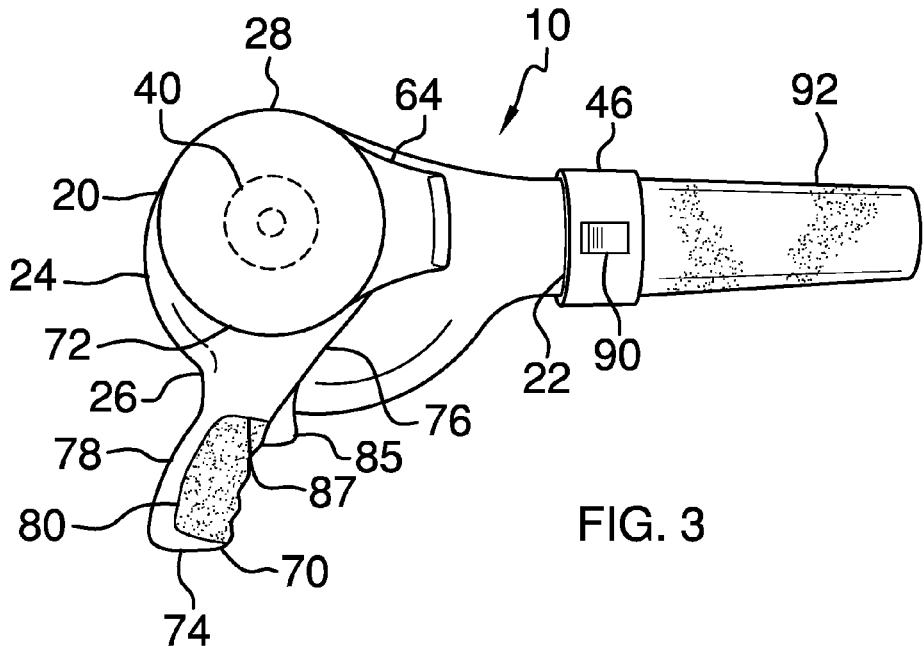
Figure 4:
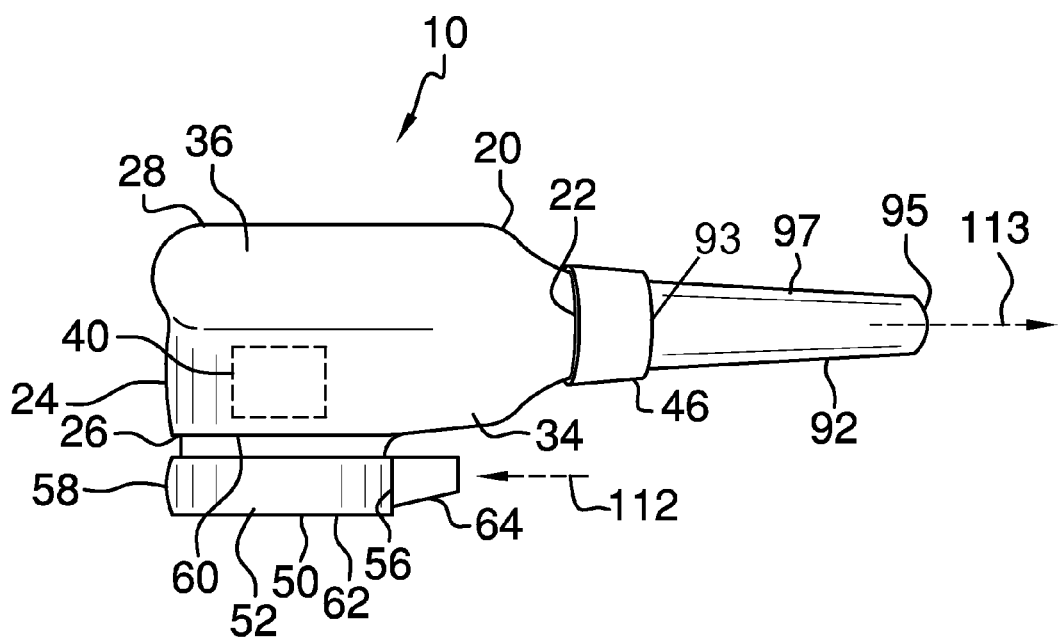
Figure 5:
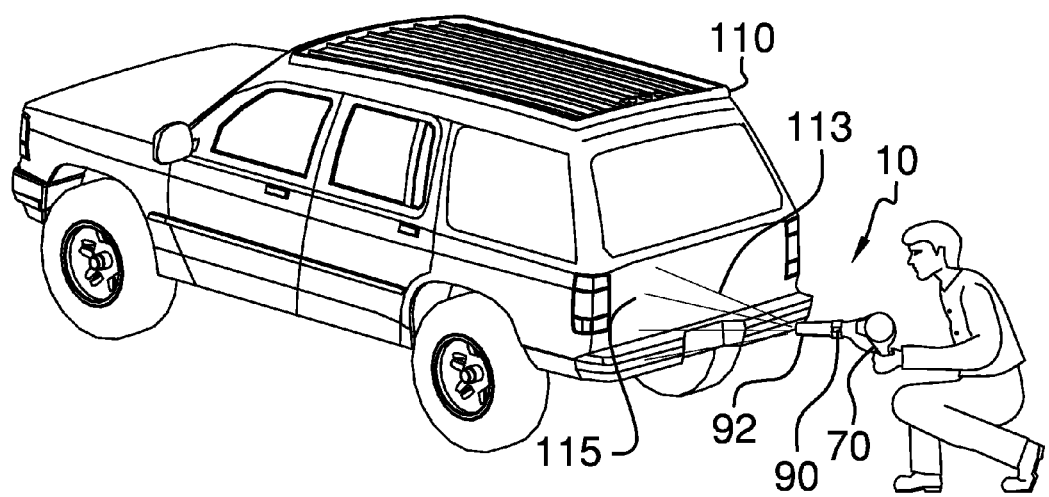

FIG. 1 is an isometric view.
FIG. 2 is a left elevation view.
FIG. 3 is a right elevation view.
FIG. 4 is a top plan view.
FIG. 5 is an in-use view showing use for drying a vehicle.

DETAILED DESCRIPTION OF THE DRAWINGS

With reference now to the drawings, and in particular FIGS. 1 through 5 thereof, example of the instant vehicle-drying air blower employing the principles and concepts of the present vehicle-drying air blower and generally designated by the reference number 10 will be described.

Referring to FIGS. 1 through 5 a preferred embodiment of the present vehicle-drying air blower 10 is illustrated. The vehicle-drying air blower 10 is designed to dry a wet vehicle exterior 110, such as the exterior of an automobile, a boat, a motorcycle, a recreational vehicle, or a semi-trailer truck.

The vehicle-drying air blower 10 includes a base housing 20 having a front end 22, a rear end 24, a first side 26, a second side 28, a top side 30, and a bottom side 32. The base housing 20 further has a driver compartment 34 disposed therein proximal to the first side 26 and a fan compartment 36 disposed therein proximal to the second side 28.

A driver 40 is disposed within the base housing 20 driver compartment 34. The driver is a gasoline engine or, alternately an electric motor. A fan 42 is disposed within the base housing 20 fan compartment 36. The driver 40 is in operational communication with the fan 42. A collar 46 is disposed around a perimeter of the front end 22 of the base housing 20.

The present vehicle-drying air blower 10 also includes an air intake housing 50. The air intake housing 50 has an upper side 52, a lower side 54, a front side 56, a rear side 58, an interior side 60, and an exterior side 62. The interior side 60 is fixedly attached to the first side 26 of the base housing 20 proximal to the rear end 24 of the basing housing 20. An intake duct 64 is disposed on the air intake housing 50 front side 56.

A handle 70 is disposed on the bottom side 32 of the base housing 20. The handle 70 has an upper end 72, a lower end 74, a forward end 76, and a rearward end 78. The upper end 72 is attached to the base housing 20. A soft rubberized ergonomic grip area 80 is disposed on the handle 70 forward end 76 proximal to the lower end 74. The soft rubberized property of the grip area 80 allow the user to more securely and comfortably hold onto the handle 70 for a longer period of time than would be the case if the grip area 80 was formed of hard material, particularly when the present air blower 10 is being used to produce air speeds of approximately 200 miles per hour. A plurality of ridges 81 and a plurality of depressions 82 therebetween are disposed within the grip area 80 on the handle 70 forward end 76. Each depression 82 is sized to accommodate a user's finger therein. The ridges 81 and the depressions 82 allow a user to more firm grip the handle 70 than if the handle 70 forward end 76 were flat.

A trigger switch 85 is disposed on the handle 70 forward end 76 proximal to a top end 87 of the grip area 80, which allows a user to hold onto the grip area 80 while operating the trigger switch 85. The trigger switch 85 is in operational communication with the driver 40. Activation of the trigger switch 85 activates the driver 40. Activation of the driver 40, in turn, activates the fan 42.

A release button 90 is disposed on the collar 46. A substantially cylindrical soft rubberized nozzle 92 is attached to the collar 46. The nozzle 46 has an inner end 93, an outer end 95, and an exterior wall 97. The inner end 93 is releasably attached to the collar 46. The release button 90 is in operational communication with the nozzle 92. Activation of the release button 90 releases the nozzle 92 from the collar 46. Upon activation of the fan 42, the fan 42 directs an incoming air stream 112 through the air intake housing 50 into the base housing 20, and an outgoing air stream 113 through the base housing 20 outwardly therefrom through the outer end 95 of the nozzle 92. As the outgoing air stream 113 exits the nozzle 92 outer end 95, the outgoing air stream 113 passes over a wet surface 115, which includes a wet vehicle exterior as shown in FIG. 5. The soft rubberized property of the entire nozzle 92 allows a user to blow dry a wet vehicle exterior 110 without denting or scratching the vehicle exterior.

The present air blower 10 uses a 10 to 12 amp electric motor or gas engine to produce an outgoing air stream of approximately 200 miles per hour. With the large capacity driver 40, the air blower 10 efficiently removes water from a vehicle exterior 110 in areas impossible to dry with a chamois.

Use:

To initiate use of the present vehicle-drying air blower, a user attaches the nozzle 92 inner end 93 to the collar 46. The user places his fingers into the grip area 80 depressions 82 to hold the handle 70 firmly and pulls the trigger switch 85 toward the handle 70 to activate the driver 40, which in turn, activates the fan 42 to direct an incoming air stream 112 through the base housing 20 and an outgoing air stream 113 through the nozzle 92 outer end 95. The user directs the outgoing air stream 113 toward a wet surface 115, including a wet vehicle exterior 110, to dry the wet surface 115.

What is claimed is:

1. A vehicle-drying air blower comprising:
    a base housing having a front end, a rear end, a first side, a second side, a top side, and a bottom side;
    a driver compartment disposed within the base housing proximal to the first side;
    a fan compartment disposed within the base housing proximal to the second side;
    a fan disposed within the base housing fan compartment;
    a driver disposed within the base housing driver compartment, the driver in operational communication with the fan;
    a collar disposed around a perimeter of the front end;
    an air intake housing having an upper side, a lower side, a front side, a rear side, an interior side and an exterior side, the interior side fixedly attached to the first side of the base housing proximal to the rear end of the base housing;
    an intake duct disposed on the air intake housing front side;
    a handle disposed on the bottom side of the base housing in a position between the air intake housing and the fan compartment and directly adjacent the driver compartment, the handle having an upper end, a lower end, a forward end, and a rearward end, wherein the upper end is attached to the base housing;
    a soft rubberized ergonomic grip area disposed on the handle forward end proximal to the lower end;
    a plurality of ridges disposed within the grip area on the handle forward end;
    a depression disposed between the ridges, wherein each depression is sized to accommodate a finger therein;
    a trigger switch disposed on the handle forward end proximal to a top end of the grip area, the trigger switch in operational communication with the driver;
    wherein activation of the trigger switch activates the driver;
    wherein activation of the driver activates the fan;
    a release button disposed on the collar;
    a substantially cylindrical soft rubberized nozzle having an inner end releasably attached to the collar, an outer end, and an exterior wall;
    wherein the release button is in operational communication with the nozzle; wherein the activation of the release button releases the nozzle from the collar;
    wherein upon activation of the fan, the fan directs an incoming air stream through the air intake housing into the base housing, and an outgoing air stream through the base housing outwardly therefrom through the outer end of the nozzle;
    wherein the outgoing air stream passes over a wet surface upon exiting the nozzle outer end whereby the wet surface is dried.

2. The vehicle-drying air blower of claim 1 wherein the driver is a gasoline engine or an electric motor, the electric motor using 10 to 12 amps.

3. The vehicle-drying air blower of claim 2 wherein the surface is a wet vehicle exterior.

4. The vehicle-drying air blower of claim 1 wherein the outgoing air stream has a velocity of approximately 200 miles per hour.

5. The vehicle-drying air blower of claim 4 wherein the driver is a gasoline engine or an electric motor, the electric motor using 10 to 12 amps.

6. The vehicle-drying air blower of claim 5 wherein the surface is a wet vehicle exterior.

* * * * *